US007016594B1

(12) United States Patent
Godil et al.

(10) Patent No.: US 7,016,594 B1
(45) Date of Patent: Mar. 21, 2006

(54) HEAT ACTUATED STEERING MOUNT FOR MAINTAINING FREQUENCY ALIGNMENT IN WAVELENGTH SELECTIVE COMPONENTS FOR OPTICAL TELECOMMUNICATIONS

(75) Inventors: Asif A. Godil, Fremont, CA (US); Eric K. Gustafson, Palo Alto, CA (US); Rajeev Patil, Fremont, CA (US); Timothy D. Stowe, Alameda, CA (US)

(73) Assignee: Lightconnect, Inc., Newark, CA (US)

( * ) Notice: Subject to any disclaimer, the term of this patent is extended or adjusted under 35 U.S.C. 154(b) by 0 days.

(21) Appl. No.: 10/915,524

(22) Filed: Aug. 9, 2004

(51) Int. Cl.
*G02B 6/00* (2006.01)
(52) U.S. Cl. .................... 385/147; 385/15; 385/31
(58) Field of Classification Search .............. 385/15, 385/31, 39, 48, 88–94; 116/202; 235/473; 362/551–558; 379/56.2
See application file for complete search history.

(56) References Cited

U.S. PATENT DOCUMENTS

| 6,856,718 B1 * | 2/2005 | Kane et al. ............ 385/147 X |
| 2005/0025449 A1 * | 2/2005 | Dirkson et al. ............ 385/147 |

* cited by examiner

*Primary Examiner*—Phan T. H. Palmer
(74) *Attorney, Agent, or Firm*—Pillsbury Winthrop, LLP

(57) ABSTRACT

A simple and robust heat actuated steering device for use with mirrors and other optical components of optical telecommunications equipment is described, together with systems which implement such devices. The device uses differential heating between two legs of a flexured mount to allow tilting that can be used to steer an optical beam. Disturbances in the optical alignment, caused by temperature changes, of an optical device containing this component can be compensated by measuring the device temperature and using this to determine a command signal, for example as provided through a lookup table, to correct for device misalignment. Techniques for calibrating the device and establishing the correction data are also disclosed.

16 Claims, 9 Drawing Sheets

US 7,016,594 B1

HEAT ACTUATED STEERING MOUNT FOR MAINTAINING FREQUENCY ALIGNMENT IN WAVELENGTH SELECTIVE COMPONENTS FOR OPTICAL TELECOMMUNICATIONS

FIELD OF THE INVENTION

This invention relates to methods and techniques for maintaining the frequency or wavelength alignment of optical components over a range of temperatures in optical telecommunications devices that control light at the optical channel level.

BACKGROUND OF THE INVENTION

Optical telecommunication components that work at the optical channel level such as Dynamic Channel Equalizers, Wavelength Blockers, Wavelength Selective Switches and similar devices often have alignment tolerances for optical beams of 50 $\mu$Rad or less. Moreover, this alignment must be maintained over wide temperature swings, for example a temperature range of 75° C. In addition, this alignment must be maintained while sustaining large accelerations in any orientation. However, thermal conditions in the operating environment can cause optical beams to become misaligned in typical channel based telecommunications components. While the alignment of optical beams is usually stable at a fixed temperature, these devices will be exposed to wide temperature swings which can introduce a variety of types of errors in optical alignment, although the magnitude of error associated with each mechanism typically differs. These mechanisms will, in general, cause the pointing of the optical beams to vary as the optical components are translated and twisted with respect to their nominally aligned positions. One mechanism which introduces error is thermo-elastic distortion of the optical housing that holds the optical components (lens, mirror, grating, waveplates, MEMS mirror arrays, etc.) in place, and can cause misalignment in the pointing of the beam impinging on the grating and the twisting of the grating itself. Both distortions change the incident angle of the light on the grating that changes both the grating dispersion and the position of the undiffracted and diffracted beams. This type of misalignment results in a change in the positions of the optical channels on the MEMS element.

Additional much smaller error mechanisms result from the change with temperature of the refractive index of the air and the glass making up the prisms used for the beam expander. The changes in the air refractive index will steer the diffracted beams because the wavelength of the light varies with the air refractive index, which in turn causes the grating dispersion to vary. As the prisms refractive index varies with temperature beams exiting the beam expander will be steered and so the incident angle at the grating will vary. Moreover, a small error can result from variation in the grating pitch caused either by thermal expansion of the grating substrate or by thermo-elastic distortions of the metal grating mount applying a stress on the grating which distorts the grating.

Although the error mechanisms discussed above in the positioning of the optical channels at the MEMS mirror array present unique challenges, the need to compensate for thermal variation has been recognized in diverse areas. Precision machine tools and clocks have for hundreds of years been designed with compensation mechanisms to correct for the changes in physical length that can lead to misalignment in machine tools and period change of mechanical oscillators as the temperature changes. This has, historically, been accomplished by any of several approaches, each of which has numerous limitations, particularly in the field of telecommunications.

The oldest technique is to use materials with different coefficients of thermal expansion attached in such a way that the lengthening of one part just compensates the lengthening of a complementary part. However, selecting materials with a complementary coefficient of thermal expansion limits the choices to materials that may be used and these materials may be difficult to use in low cost manufacturing. In addition, the materials used to make the optical components (gratings, lenses, prisms, window and optical crystals) may then have large coefficient of thermal expansion mismatches between themselves and the metal housing.

A second technique has been to temperature control the mechanism by placing it in an oven and then using active feedback control to keep the temperature constant. Maintaining a constant temperature, however, requires either setting the oven temperature above the highest temperature ever expected or including a cooling element along with the oven. Both of these approaches will require the consumption of large amounts of power. In addition, continually operating the device at a high temperature will accelerate the natural aging mechanisms of the components and epoxy joints between components.

A third approach is to select materials with very low thermal expansion coefficients. Such a passive compensation scheme will only work if the nature and magnitude of the disturbance to the optical plant is known and constant. In addition, such schemes typically suffer from most of the ills of the complementary approach described first above.

As a result none of the historical approaches has proven well suited to the demands of the telecommunications industry, where precision, low power consumption, long life, high reliability and low cost are considered desirable in some or all embodiments.

SUMMARY OF THE INVENTION

The heat actuated steering mount and method described herein avoids most of the limitations of the prior art while providing robust compensation of a wide array of disturbances that can result from temperature variation of the optical package and its components. In particular, the present invention is a heat actuated steering mount on which, for example, a mirror may be mounted that can be used to steer optical beams with a dynamic range sufficient to maintain optical alignment while at the same time withstanding large accelerations in any orientation. While the discussion hereinafter is directed to the mounting of a mirror on the mount of the present invention, it will be appreciated that the mirror is exemplary only and the mount could be used in certain implementations with other optical components, including the grating or wavelength dispersion element, the lens, a MEMS element, a collimator, an optical fiber, or any other optical component. It will also be appreciated a collimator may include multiple collimators, for purposes of the present disclosure.

In an exemplary application, the device of the present invention is used to provide steering for a mirror affixed to the mount of the invention, where the mirror may be used, for example, in a free space optical path such as in an optical switch. In the exemplary arrangement discussed hereinafter, the heat actuated steering mount is positioned before the grating, although such a position is not required in all embodiments, particularly where the mount is used on other elements. In one implementation, the invention uses differential heating between two legs of a flexured mount to allow tilting of the mirror, which in turn will steer an optical beam. Disturbances to the optical path caused by temperature changes can then be compensated by measuring the temperature of the optical platform and using it to correct for this disturbance. In one exemplary arrangement, the fixture temperature is used with a lookup table and other logic to generate a corrective command signal.

DETAILED DESCRIPTION OF THE INVENTION

Figure 1:
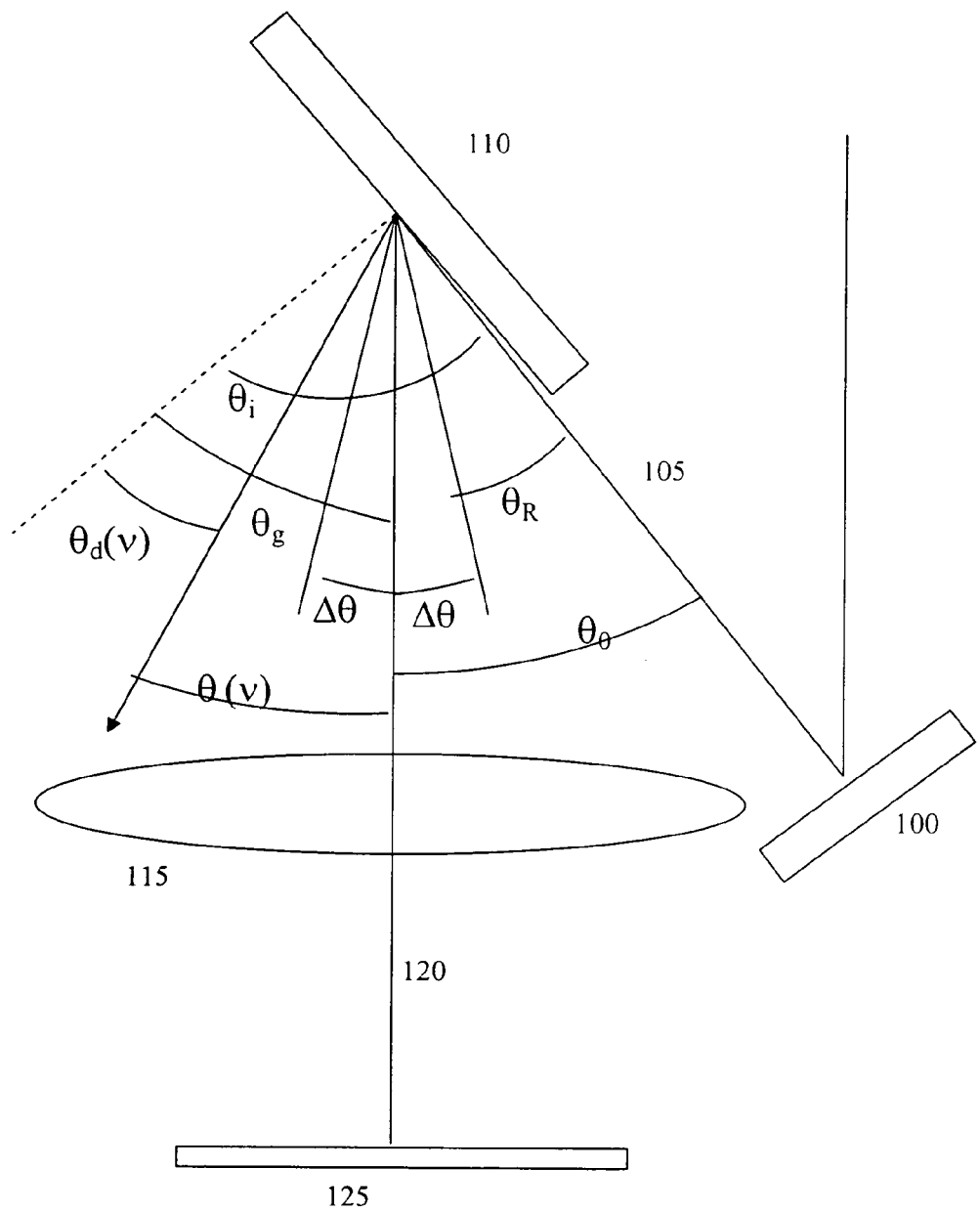
FIG. 1 shows, in schematic plan view, one arrangement of a system comprising a heat actuated steering mount, grating, lens and MEMS device as might be used in an optical component controlling light at the optical channel level for use with the present invention, and also provides definitions of the angles defining the geometry of the problem.

Referring first to FIG. 1, a greater understanding of the error mechanisms associated with the optical channel position on the MEMS array can be gained. As noted previously, multiple error mechanisms exist, all related to temperature variation, which can lead to misalignment of the optical beam including thermo-elastic distortion of the optical housing, changes in the refractive index of air within the optical channel, changes in the refractive index of the glass used for the prisms and grating pitch variation.

FIG. 1 shows a portion of an exemplary optical path including the position of the turning mirror 100, path between the mirror and the grating 105, grating 110, lens 115, central ray traveling from the grating through the center of the lens 120 and a MEMS actuator array 125. A complete depiction of an optical path is provided in U.S. patent application Ser. No. 10/371,907, entitled System and Method for Seamless Spectral Control and filed Feb. 20, 2003, and incorporated herein by reference. In addition, FIG. 1 defines the relevant angles. From the grating equation we can compute the angle between the central ray and a diffracted ray of frequency v:

$$\theta(v) = \theta_g^{(0)} - \sin^{-1}\left[\frac{c}{dv} - \sin(\theta_g^{(0)} + \Delta\theta + \theta_R^{(0)})\right] = \theta_g^{(0)} - \sin^{-1}\left[\frac{c}{dv} - \sin(\theta_g^{(0)} + \theta_0^{(0)})\right],$$

where the angles superscripted with 0 are the nominally aligned angles and $\Delta\theta$ the angle between the central ray which passes through the center of the lens and the direction of the two rays defined by the lowest and the highest frequency optical channels. The grating groove spacing is d. Writing this expression as a power series in the frequency leads to:

$$\theta(v) = \theta(v_0) + \frac{d\theta(v)}{dv}\bigg|_{v=v_0}(v-v_0) + \frac{1}{2}\frac{d^2\theta(v)}{dv^2}\bigg|_{v=v_0}(v-v_0)^2 + \ldots$$

Writing out the first two terms gives:

$$\theta(v) \approx \left\{\theta_g^{(0)} - \sin^{-1}\left[\frac{c}{dv_0} - \sin(\theta_g^{(0)} + \theta_0^{(0)})\right]\right\} + \left\{\sqrt{1 - \left[\frac{c}{dv_0} - \sin(\theta_g^{(0)} + \theta_0^{(0)})\right]^2}\left(\frac{c\Delta v}{dv_0^2}\right)\right\}\left(\frac{v-v_0}{\Delta v}\right)$$

where the grating angle $\theta_g^{(0)}$ and the input angle $\theta_0^{(0)}$ enter in different ways for the first term (the frequency independent term.) In the term linear in the frequency $\theta_g^{(0)}$ and $\theta_0^{(0)}$ enter in the same way. The first term just determines the position of the frequency $v_0$ on the MEMS, the second term determines the linear part of the dispersion and the higher order terms determine the higher order nonlinearities of the dispersion. While the constant term is more sensitive to the grating angle than the input angle, all other terms are equally sensitive to both angles.

The ultimate error to be compensated with the present invention is the position of all of the optical channels on the MEMS element. There is presently no inexpensive way to sense this error once the component is deployed in the field. One way that this measurement could be accomplished would be to use a detector array and a focusing lens inside the optical package as described in System and Method for Dynamic Spectral Control for Optical Networks, U.S. patent application Ser. No. 10/059,900, filed Jan. 28, 2002 and assigned to the same assignee as the present invention, and incorporated herein in full by reference.

In this approach light reflected from the grating on its return from the MEMS is collected with a lens and focused on a detector array. By measuring the change in averaged position of all of the optical channels on the detector array changes in the incident angle on the grating can be estimated. A second approach is to use a frequency stable light source to provide an error signal by reflecting it from the optical steering element then onto the grating and by measuring the position of the light reflected from the grating with a position sensitive detector. The changes to the incident angle on the grating could be sensed by measuring the position of the reflected beam across the detector. However, it has been determined that the distortions and misalignment caused by these various error mechanisms resulting from simple average temperature changes of the optical package are deterministic and repeatable. It has also been determined that, during manufacturing, the error introduced by the various mechanisms can be measured as a function of the temperature of the optical housing. In turn, the data can be used to develop a correction signal for the alignment error based on the temperature of the housing. In an exemplary implementation, a table relating the temperature of the optical package to alignment error can be created.

Once the correction signal data is developed, the temperature of the optical package can be measured during operation of the device. The corresponding correction signal for the angular displacement can then be determined, and the appropriate command signal applied to the heat actuated steering mirror mount.

In the exemplary implementation described herein, the mount is used in an open loop configuration. As a result, it is desirable that hysteresis and long-term drift remain low. One implementation for achieving this uses thermal actuation of a small rigid metal structure to provide optical beam deflection through the tilting of a mirror. To accommodate the large operating temperature range and mechanical stability desired for at least some implementations, one approach uses a monolithic solution built from a stable metal and with a highly symmetric design so that average temperature variations of the device do not result in beam steering but simply produce a uniform expansion of the mirror mount. Because the dynamic range required is small, typically on the order of only a few hundred micro-radians, it has been discovered that an approach based on thermal expansion is effective.

Figure 2:
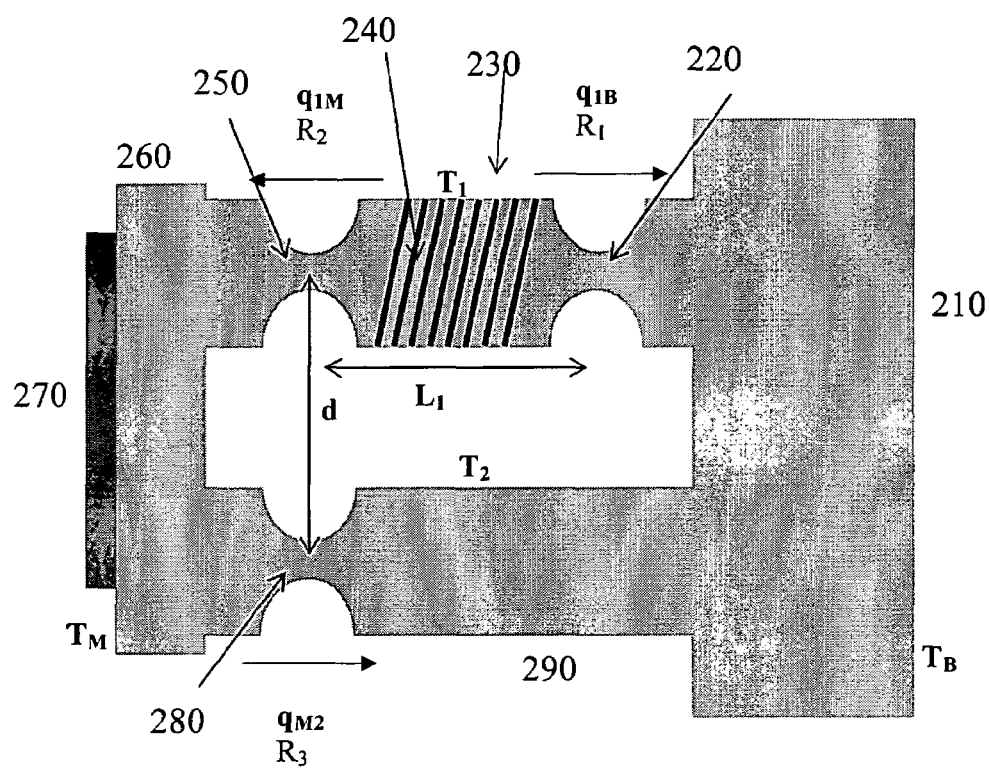
FIG. 2 illustrates in schematic view an exemplary geometry of the heat actuated mirror mount. The stripes are the heater on the upper leg. The lever arm over which the thermal expansion tilts the mirror is d. $T_B$ is the base temperature, $T_M$ the mirror temperature and $T_1$ and $T_2$ are the temperatures of the two legs.

FIG. 2 below shows a schematic diagram of Such a device. A mount 200 includes upper leg 230 and lower leg 290 affixed to both a base 210 and a distal crossmember 260. A heater 240 (striped region) is positioned on the upper leg 230, and typically comprises a resistor capable of heating the upper leg through a ranges of temperatures greater than that experienced by the lower leg, for example a 1.0 Watt heater will raise the upper leg temperature to approximate 25° C. higher than the lower leg temperature. A mirror 270 is affixed to the crossmember 260 as shown. The differential heating of the upper leg 230 relative to the lower leg 290 tilts the mirror 250 over the lever arm d through differential thermal expansion. The base 210 temperature is shown as TB, the crossmember 260 temperature is $T_M$ (the temperature of the mirror 270 is assumed to be the same as the crossmember temperature), and the temperatures of the two legs are shown as $T_1$ and $T_2$, respectively. A narrowed region 280 (with thermal resistance $R_3$) exists on the lower leg 290, while a pair of narrowed regions 220 (with thermal resistance $R_1$) and 250 (with thermal resistance $R_2$) exist on the upper leg 230. The necked down regions 220 and 250 in the upper heated leg 230 provide thermal resistance that allows the temperature of the heated leg 230 to rise in response to relatively little applied power through the heater 240. The reduced thickness regions also provide a compliant flexure allowing the mount to tilt. In one implementation, the entire structure of the mount is made from a single material, (for example, stainless steel, Kovar, or aluminum), although other embodiments not having such a unitary structure are also acceptable in at least certain applications.

In operation, the regions at temperatures $T_B$ and $T_2$ will have substantially the same temperatures because their thermal resistance is low due to their large cross-sectional area. The temperature gradients will occur mainly across the three flexures between $T_1$ to $T_B$, $T_1$, to $T_M$ and $T_M$ to $T_2$ because their cross-sectional area is small. The temperature of the base, $T_B$, is the temperature of the optical housing. The heat flow between regions in steady state can be written $$q_{1B} = \frac{T_1 - T_B}{R_1} \quad q_{1M} = \frac{T_1 - T_M}{R_2} \quad q_{MB} = \frac{T_M - T_B}{R_3}$$

Where the thermal resistance $R_n$ is $$R = \frac{l}{kA} = \frac{l}{kth}$$

k is the thermal conductivity of the metal, l is the length of the flexure, t is the thickness of the flexure and h is the flexure height. The conservation of energy requires that $$q_{Heater} = q_{1B} + q_{1M}$$

$$q_{1M} = q_{MB}$$

Substituting in for the heat flows and putting the unknowns on the left side of the equations we find.

$$T_1 - R_1 q_{1B} = T_B$$

$$T_1 - T_M - R_2 q_{1M} = 0$$

$$T_M - R_3 q_{1M} = T_B$$

$$q_{1B} + q_{1M} = q_{Heater}$$

The four equations can be solved for the four unknowns $T_1$, $T_M$, $q_{1B}$ and $q_{1M}$. In turn, the temperature of the heated arm $T_1$ can be computed for a given input power $q_{Heater}$.

$$T_1 = T_B + \frac{R_1(R_2 + R_3)}{(R_1 + R_2 + R_3)} q_{Heater}$$

Computing the new lengths of the two arms $L_1(T_1)$ and $L_2(T_2)$ as a function of input power using the following expressions for linear thermal expansion:

$$L_1(T_1) = L_0[1 + \alpha(T_1 - T_0)]$$

$$L_2(T_B) = L_0[1 + \alpha(T_B - T_0)]$$

From these displacements the amount of tilt applied to the mirror can be computed as:

$$\theta(T_1, T_2) = \frac{[L_1(T_1) - L_2(T_B)]}{d} = \alpha \frac{L_0}{d}(T_1 - T_B) = \alpha \frac{L_0}{d} \frac{R_1 R_2}{(R_1 + R_2 + R_3)} q_{Heater}$$

Figure 3:
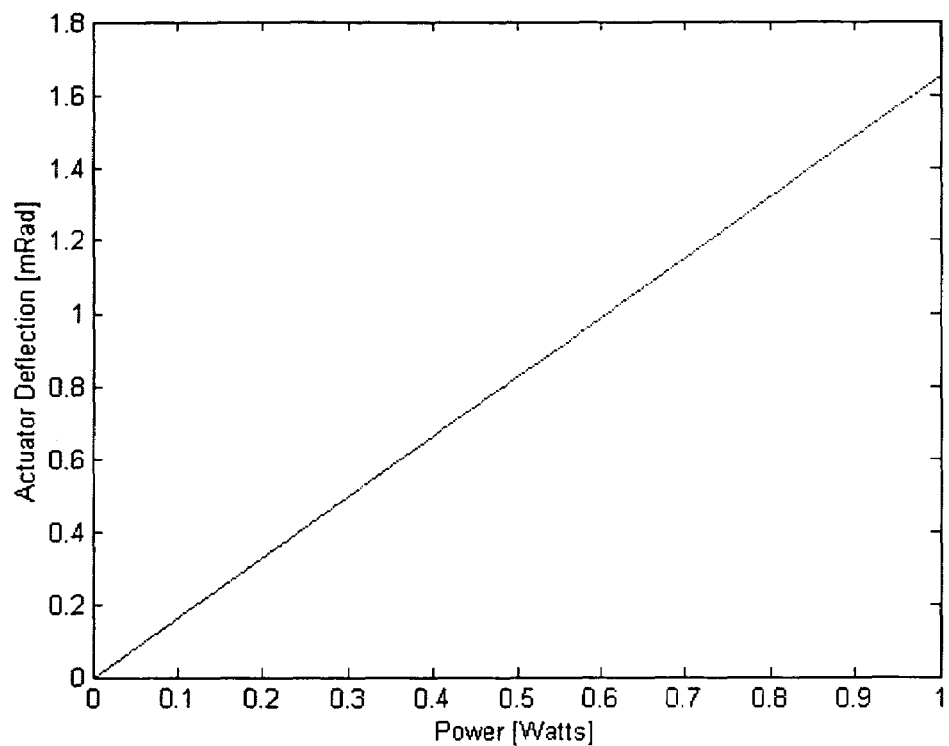
FIG. 3 shows the computed deflection of a mirror as a function of the power applied to the upper leg of the heat actuated steering mount in accordance with the invention.

FIG. 3 below shows the angular tilt as a function of heater power for the following conditions:

Heat actuated Steering Mount of All Stainless Steel Construction

| | | |
|---|---|---|
| L | Arm Lengths | 6 mm |
| d | Lever arm length | 2 mm |
| l | Flexure length | 1 mm |
| t | Flexure thickness | 0.1 mm |
| h | Flexure height | 1 mm |

For an exemplary configuration such as described above in connection with FIG. 4, one watt of heater power deposited in the upper arm will cause the actuator to deflect by 1.6 mRad. To reach steady state operation from a starting condition of zero watts requires approximately 120 seconds. If the power is turned off from the fully deflected state the device will reach the no deflection position in 60 seconds. It will be appreciated that the particular amounts of power, and the associated response times, are exemplary only and will vary over a wide range depending on the particular design. As a result, it is not intended that the invention be limited to particular power ranges or response times.

Figure 4:
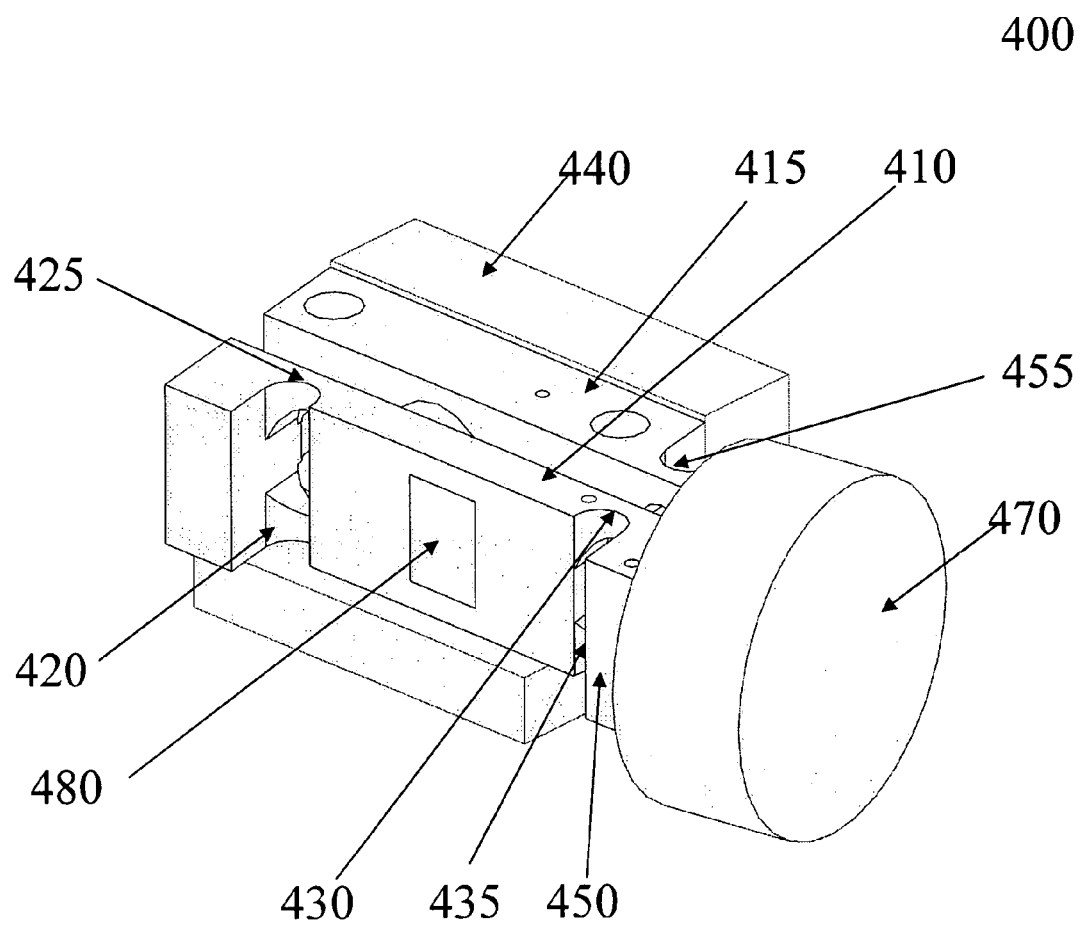
FIG. 4 shows in perspective view one example of a heat actuated steering mount in accordance with the invention. Heat applied by running current through a resistor that is epoxied onto the front leg will produce differential thermal expansion of the two legs and will tilt the mirror. The flexures allow the structure to tilt and also restrict the flow of heat allowing as little as 0.5 watts to be used to tilt the mirror by one mrad.

FIG. 4, below, shows a mechanical design in perspective view (as opposed to the plan view shown in FIG. 2) for a heat controlled tilt actuator according to the present invention. The two legs 410 and 415 are stiff members with upper and lower flexure 420, 425, 430, 435, and 455. There is a sixth flexure paired with 455 which is invisible in this picture. Flexures 420 and 425 have a thermal resistance R1, 430 and 435 a thermal resistance R2, and 455 and the invisible flexure have a thermal resistance R3. It will be appreciated that the legs are mechanically stiff and will expand but will not bend as they heat up. The flexures are compliant and will allow the mount to distort, thus tipping the mirror, as the legs are differentially heated. One leg 415 is attached to a mechanical base 440 that is fastened to the optical housing (not shown). The legs are fixed through flexures to a rigid mounting plate 450 to which the mirror 470 is mounted. The vertical arrangement of the upper (425, 430 and 455) and lower flexures (420, 435 and the invisible one) provide rigidity against tipping forces that would point the mirror up or down while still allowing it to tilt from side to side. The large footprint base 440 provides both a good thermal contact and a rigid physical attachment with the optical package. Heat applied by running current through a resistor 480 which may, for example, be epoxied onto the front leg 410, will produce differential thermal expansion of the two legs 410 and 415 and will tilt the mounting plate 450 and consequently the mirror 470. The flexures 420, 425, 430, 435 and 455 allow the mounting plate 450 to tilt and also restrict the flow of heat out of the center portion of the leg 410, thus allowing as little as 0.5 watts to be used to tilt the mirror by one mrad.

Figure 5:
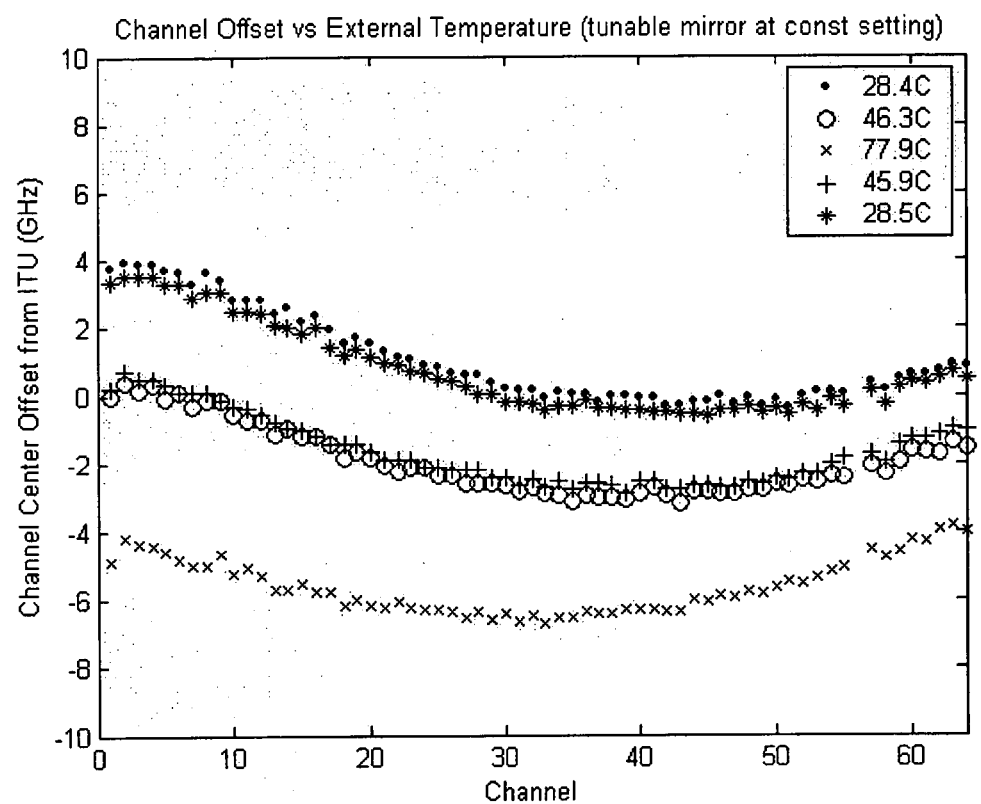
FIG. 5 shows the frequency registration error of the filter centers of a Dynamic Channel Equalizer (DCE) compared to the ITU grid at five different temperatures, where the DCE does not use the mount of the present invention. There is a quadratic error of about + or −2 GHz which is the same at all temperatures and an overall average shift of 8 GHz over a range of temperatures from 28.4 to 77.9 C.
Figure 6:
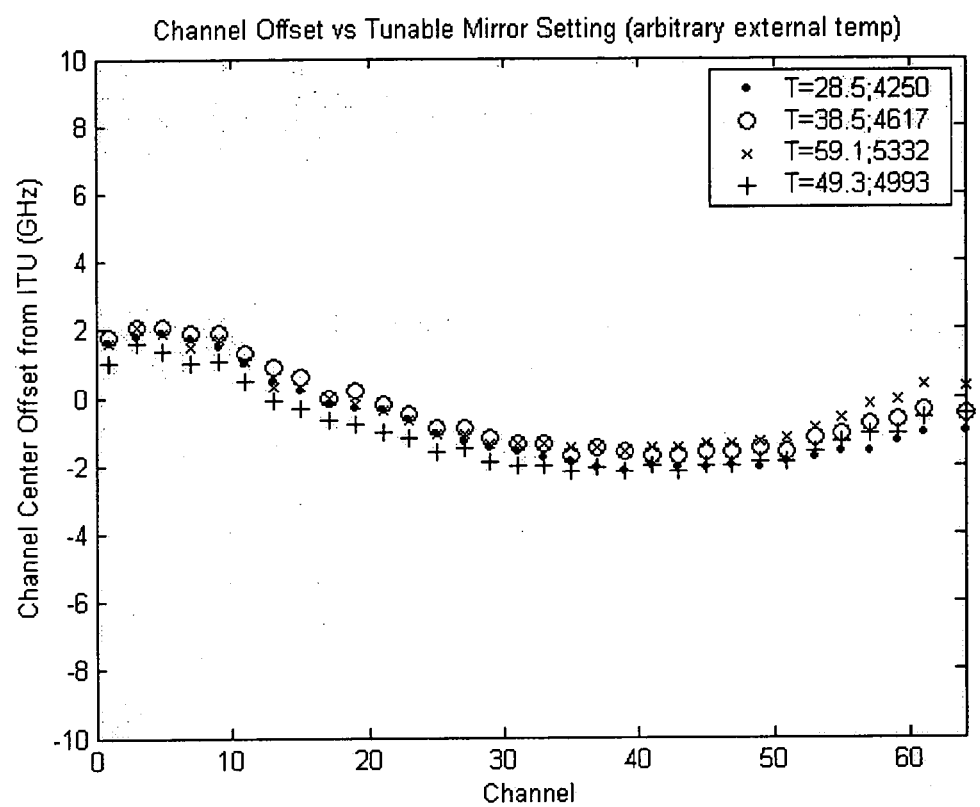
FIG. 6 illustrates the result of applying the mirror fixture compensation scheme of the present invention to the same design of DCE as for FIG. 5, and operated at five temperatures reduced the temperature dependant variations from 8 GHz to 1 GHz.
Figure 8:
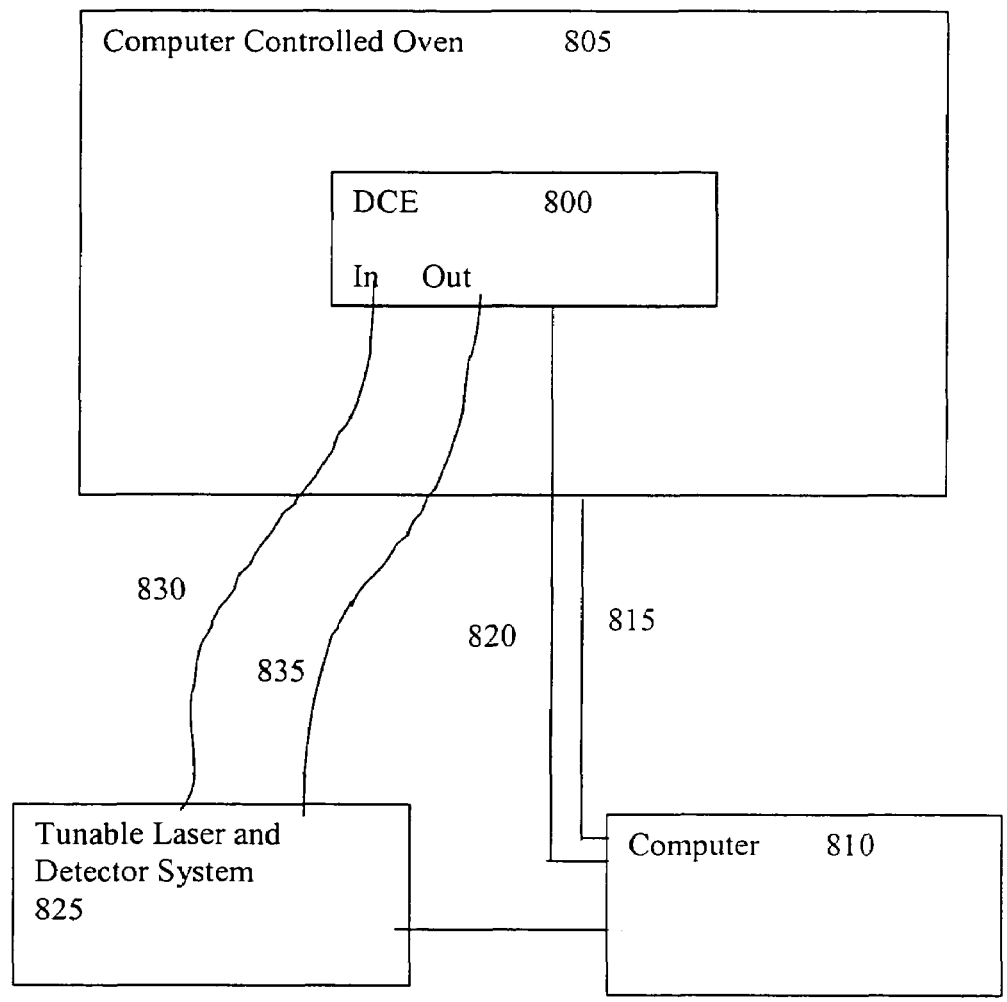
FIG. 8A illustrates in system level schematic diagram form a system to collect the data appropriate for development of the correction signals used with the present invention.
FIG. 8B illustrates in schematic diagram form the control system for supplying a correction signal to the heating element of a heat actuated steering mount according to the present invention.

FIG. 5 and FIG. 6 provide a comparative graphical illustration of the performance of the heat-actuated mirror. In FIG. 5, the frequency registration error between the ITU grid and the measured centers of the optical filters in a Dynamic Channel Equalizer is shown at five different temperatures. There are two components to the errors. First there is a small temperature independent error with a magnitude of roughly three gigahertz across the ITU grid. Second there is an overall shift in the error spectrum of roughly eight gigahertz between 25° and 69° C. The heat actuated steering mount of the present invention will compensate for the latter error, as discussed in further detail in connection with FIG. 8, below. In general, a table of correction signal data may be developed by measuring the error as a function of the optical package temperature and the power applied to the hot mirror. With this combination of data, a calibration signal may be obtained, which makes it possible to determine the appropriate power to apply to the hot mirror for any optical package temperature to minimize the overall error.

Figure 7:
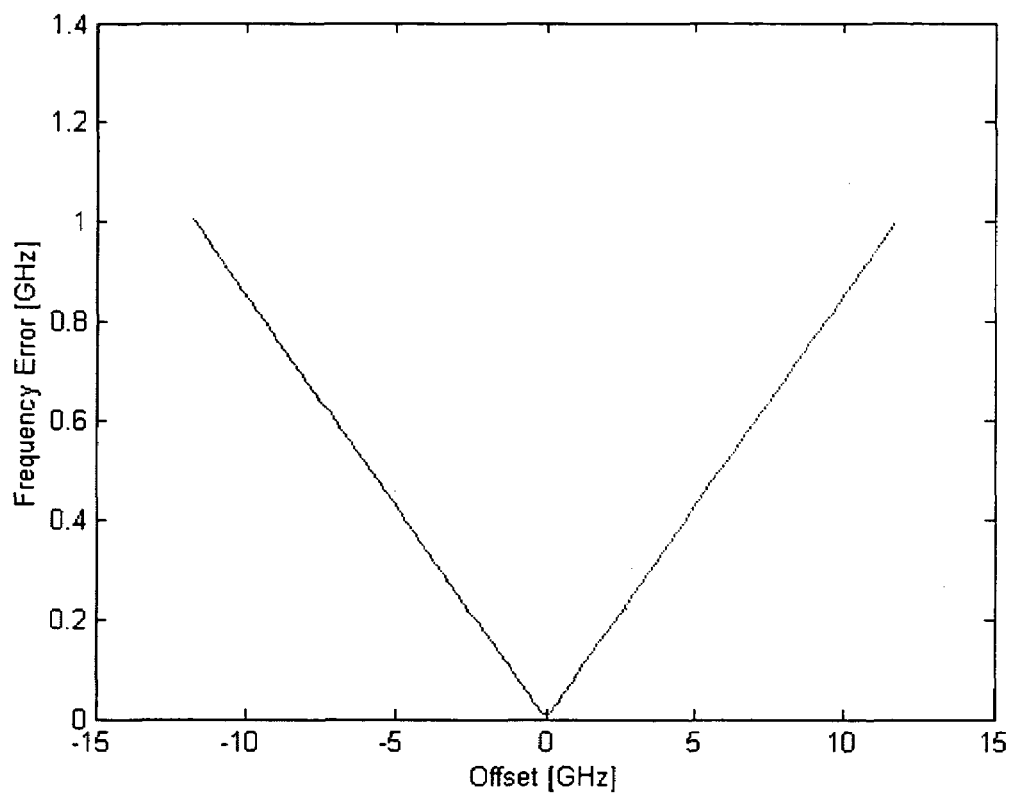
FIG. 7 graphically illustrates the maximum error of any actuator away from the ITU Grid as a function of the average offset of all channels, with use of the heat actuated steering mount in accordance with the present invention. Deviations of between −10 and +10 GHz can be corrected with the hot mirror without introducing an error of larger that 1 GHz.

FIG. 6 illustrates the improvements achieved through use of the heat actuated steering mount of the present invention. In particular, FIG. 6 graphically illustrates the temperature dependent frequency registration error of a DCE at four different temperatures, where the optical path incorporates a turning mirror affixed to the present invention in a manner similar to that shown in FIG. 4D of U.S. patent application Ser. No. 10/371,907, entitled System and Method for Seamless Spectral Control filed Feb. 20, 2003, and incorporated herein by reference. As shown in FIG. 6, the heat actuated steering mount of the present invention reduces the overall temperature dependent variations to 1 GHz, down from 8 GHz, relative to the prior art arrangement of FIG. 5. FIG. 7 shows a calculation of the residual error (in this case 1 GHz) after hot mirror compensation for frequency shifts between −10 and +10 GHz. It can be appreciated that the heat actuated steering mount of the present invention, used in conjunction with the turning mirror, compensates for misalignment of the DCE. More specifically, FIG. 7 shows that deviations of between −10 and +10 GHz can be corrected with the hot mirror without introducing a maximum error of larger that 1 GHz.

FIG. 8A illustrates a system for the calibration of the actuatable mirror of the present invention. A Dynamic Channel Equalizer (DCE) 800 or other device in which the present invention is used is placed in a controlled oven 805. A controller 810, such as a computer or similar system, controls the temperature of the oven 805 via cabling 815, and also controls the optical device 800 under test via signal cabling 820. In addition, the controller 810 also controls the command signal to the heat actuated steering mount. Further, the computer also controls a tunable laser system and an optical receiver 825, which is sometimes referred to as a Swept Wavelength System and includes a tunable laser with a polarization controller and a photodiode detector which in turn provides input to and receives output from the DCE 800 via fibers 830 and 835, respectively.

The computer commands the oven to a temperature T1, sets the DCE so that all of the even actuators are in the blocking state and the odd actuators are in the thru state and commands the actuatable mirror to voltage V1 and then measures an attenuation spectrum with the Swept Wavelength System. The computer stores this spectrum. The even actuators are then put into the thru state and the odds to the blocking state and a second spectrum is recorded. The mirror command voltage is set to V2 and two more attenuation spectra are taken. This is repeated for several more voltages and then the temperature is set to T2. The whole procedure of measuring spectra and changing the voltages is repeated and this is done for several temperatures. The center frequencies of all of the actuators are then determined at each temperature and each mirror command voltage and from this information a table is made which determines for each temperature what command voltage minimizes the maximum actuator center frequency error. In an exemplary arrangement, this data is then fit to a low order polynomial to allow the estimation of a command voltage for any temperature. Other approaches, for example a look-up table, will be apparent to those skilled in the art.

Figure 8B:
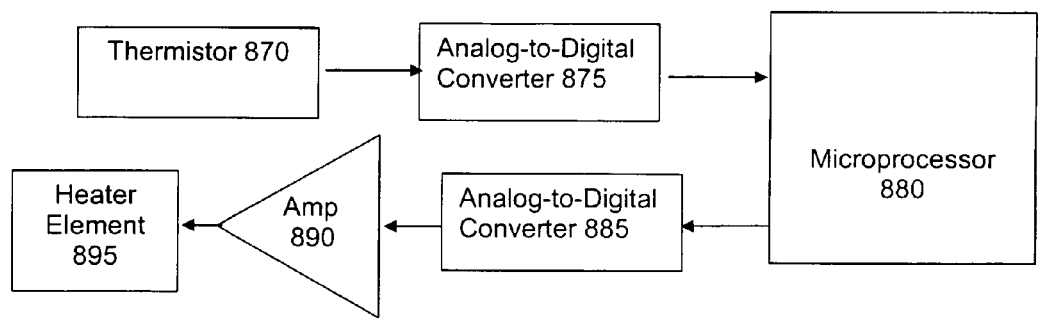

During operation, the DCE electronics constantly monitors the temperature of the DCE and uses this temperature and the polynomial coefficients to compute the command voltage which will maintain the DCE actuator filters centered on the ITU grid. An exemplary arrangement is shown in FIG. 8B, in which a thermistor 870 measures the operating temperature of the optical assembly, which in an exemplary arrangement is substantially the same as the temperature TB of the base of the actuator 440 (FIG. 4). This temperature measurement is monitored by a microprocessor 880 [typically included in the DCE electronics] through an analog-to-digital converter 875. In the exemplary arrangement described here, the microprocessor 880 then obtains a command value from the polynomial relating the temperature to the required voltage for the heater 895. The microprocessor 880 then generates a control signal which, when converted by a digital-to-analog converter 885, applies a control voltage to the heater driver 890 to drive the heater accordingly, thus maintaining the DCE actuator filters in the desired location. It will be appreciated that the polynomial fit between temperature and voltage described in the exemplary embodiment is only one way of providing such control parameters; numerous other methods are also possible, including a lookup table. It will also be appreciated by those skilled in the art that the polynomial, lookup table or other method for providing the control parameters will be maintained in a memory integrated into or associated with the microprocessor or controller 880.

Having fully described an exemplary embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A system for compensating for thermally-induced alignment errors in free-space optical systems comprising
   an input port adapted to receive an input beam,
   a mount,
   an optical element, intended to be in optical alignment with the input beam during operation, affixed to the mount,
   a heater for causing the mount to flex in response to variations in temperature to maintain optical alignment between the input beam and downstream components.

2. The system of claim 1 wherein the optical element is one of a group comprising a mirror, a collimator, a wavelength dispersion element, and a MEMS element.

3. The system of claim 1 wherein the optical element is a mirror.

4. A mount for compensating for alignment errors in a free space optical path caused by temperature variations comprising
   a base,
   a crossmember adapted to receive an optical element,
   a first leg,
   a second leg,
   a heater associated with the first leg for selectively heating the first leg relative to the second leg to adjust the position of the optical element.

5. The mount of claim 4 wherein the mount is constructed of a single material.

6. The mount of claim 5 wherein the material is one of a group comprising stainless steel, Kovar and aluminum.

7. The mount of claim 4 wherein the heater is a resistor.

8. The mount of claim 7 wherein the heater is affixed to the first leg.

9. The mount of claim 4 further comprising a temperature sensor for detecting ambient temperature.

10. The mount of claim 9 further including a selectively variable electrical power source responsive to the temperature sensor for adjusting the heater.

11. The mount of claim 4 wherein the first leg includes at least one narrowed region.

12. The mount of claim 4 wherein the first leg includes two narrowed regions for providing thermal isolation of the first leg relative to the second leg.

13. The mount of claim 4 wherein the mount is constructed of more than one material.

14. The mount of claim 4 wherein the optical element is one of a group comprising a mirror, a collimator, a wavelength dispersion element, and a MEMS element.

15. A method for calibrating a mount capable of adjusting the position of an optical element mounted thereon in response to applied voltages comprising
   adjusting the ambient temperature of the mount to a first predetermined temperature,
   applying a first amount of electrical power to the mount,
   recording an indicia representative of the change in position of the associated optical element in response to the first amount,
   applying a second amount of electrical power to the mount,
   recording an indicia representative of the change in position of the associated optical element in response to the second amount,
   repeating the adjusting, applying and recording steps for a predetermined number of temperatures and voltages,
   storing the indicia representative of the change in position responsive to each amount of applied power at the various predetermined temperatures.

16. A method for maintaining optical alignment within a free space optical system susceptible to temperature-induced alignment errors comprising
   providing an input beam,
   positioning an optical element in free space optical alignment with the input beam,
   affixing the optical element onto a mount responsive to differential heating to adjusting the position of the optical element in at least one dimension, and
   adjusting the differential heating of the mount in response to variations in ambient temperature.

* * * * *